April 10, 1951     F. HAGUE     2,548,431
TANK CONSTRUCTION FOR MEASURING AND DISPENSING
Filed April 10, 1945
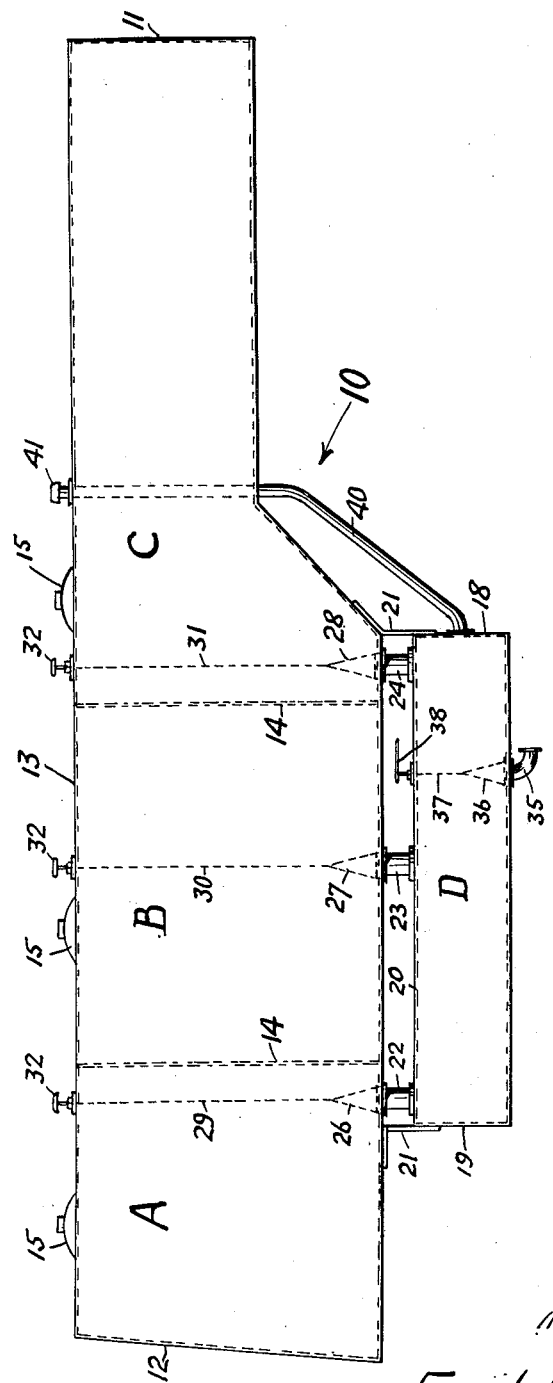
INVENTOR
Fred Hague
BY
ATTORNEYS.
WITNESS:

UNITED STATES PATENT OFFICE 2,548,431

TANK CONSTRUCTION FOR MEASURING AND DISPENSING

Fred Hague, Devon, Pa., assignor to Sun Oil Company, Philadelphia, Pa., a corporation of New Jersey Application April 10, 1945, Serial No. 587,472

1 Claim. (Cl. 222—450)

This invention relates broadly to a cargo truck, and primarily to a truck adapted to transport gasoline or other hydrocarbon fluids from one place to another. More particularly the invention relates to a cargo truck adapted to dispense a measured quantity of fluid, such as gasoline or the like.

The tank of a gasoline cargo truck is normally formed of a plurality of compartments, the compartments being independent of each other and adapted to contain predetermined quantities of fluid. It has been found important to distribute the weight of gasoline or other fluid within the tank so as not to place undue strains and stresses on the truck chassis particularly after one or more of the compartments have been emptied. Accordingly the compartments of the tank usually vary in capacity.

In normal practice, the gasoline cargo truck is filled to capacity, and the truck is then driven from a central storage location to one or more places of consumer distribution, such as gasoline service stations. It then becomes necessary for the operator of the truck to dispense a certain measured quantity of gasoline to the service station, and this operation is subject to many serious problems. Obviously, it is important to dispense the exact quantity of fluid desired. Also, as there are many city ordinances, fire regulations and the like which must be observed, the dispensing of fluids such as gasoline or other volatile hydrocarbon fluids must be performed in a proper and safe manner.

There have been numerous attempts in the past to solve this problem, many of which have met with varying degrees of success. The two most common procedures are to dispense a full compartment of fluid to the service station or to deliver a predetermined amount of fluid, using special devices designed for this purpose. For instance, if one of the compartments of the tank holds 1200 gallons, another compartment holds 1500 gallons and still another compartment holds 1800 gallons, and if the service station operator desires delivery of 1200 gallons, the fluid in the 1200 gallon compartment is dispensed. If the service station operator desires 1500 gallons or 1800 gallons the fluid in the particular compartment holding the desired quantity is dispensed. Under these circumstances, there is no particular problem involved in the delivery. However, it is seldom that the service station desires the exact quantity of fluid held in one or more of the compartments of the cargo truck. Usually, a greater or lesser quantity of fluid is desired than that stored in a particular compartment. To take care of this problem, it has become customary to install metering devices and the like adjacent the cargo tank so as to measure the fluid dispensed. Metered trucks, while overcoming many of the older problems, are subject to a number of additional problems. The metering devices are expensive to make and install, and (as is true in all mechanical devices), they are subject to wear and breakdown, as well as error. Accordingly, these meters are subject to constant repair, testing and supervision in order to make certain that they are accurate. The additional service required to maintain the meters in proper functioning order entails considerable manpower and expense. Also, in transporting fluid, such as gasoline, from one place to another, the fluid is considerably agitated causing formation of gas, air bubbles and the like within the fluid, which materially affects the accuracy of the meter and additional mechanisms of dubious value are required to counteract the effect of the air or gas infiltrations. Accordingly, while the meter may be properly adjusted to indicate an accurate measurement when the cargo truck leaves the main storage place, it may not necessarily dispense an accurately measured volume of fluid at a remote point.

The prime object of this invention is to overcome the aforementioned and other deficiencies in the prior art.

Another important object of the invention is to provide a cargo truck apparatus which will enable the operator to dispense a predetermined measured quantity of fluid, which quantity may be varied at will, wherein the apparatus for so dispensing is not subject to inaccuracies, wear, repairs, and the like.

Another object of the invention is to provide a gasoline cargo truck which is capable of dispensing an accurate measured quantity of fluid wherein such quantity may not necessarily equal the capacity of any one of the usual compartments provided within the cargo tank.

Still another object of the invention is to provide a gasoline cargo truck capable of dispensing a predetermined measured quantity of fluid therefrom wherein substantially the same apparatus is utilized to load the truck with fluid thereby eliminating the usual loading manifold and pipe system.

Another object of the invention is to utilize the usual compartmented cargo truck tank now in extensive use to transport and dispense a measured quantity of gasoline or the like wherein the alterations necessary thereto to perform such function may be made quickly and inexpensively.

The drawing is a schematic view of the invention, showing only the tank, compartments therein and the apparatus in combination therewith which forms the subject of the present invention.

The general arrangement of the invention resides in a gasoline cargo tank adapted to be secured to a truck chassis or other suitable suspension arrangement, wherein the main portion of the tank is provided with one or more partitions to form separate individual compartments. Each compartment is adapted to hold a predetermined measured quantity of fluid. An auxiliary measuring tank or receptacle of lesser volume than the main compartments is positioned in a lower horizontal plane relative to the main compartments, and is preferably mounted on and below the main compartments. Valved conduits are provided between each of the compartments and the measuring receptacle in a manner so that the fluid may flow by gravity from the compartments into the measuring receptacle. The valved conduits are capable of selective control so that fluid may flow by gravity from one compartment into the measuring receptacle while the fluid in the remaining compartment or compartments is prevented from flowing into the measuring receptacle. This flexible valve control arrangement also facilitates loading the several compartments where the auxiliary measuring tank functions as a manifold.

A dispensing outlet is positioned adjacent the bottom of the measuring receptacle and is controlled by a suitable valve, so that fluid may flow by gravity from the measuring receptacle. A filling conduit or loading tube is preferably connected to the measuring receptacle so that each of the compartments within the cargo tank may be filled with fluid through the measuring compartment, the fluid being caused to flow into the measuring receptacle and thereafter into each of the various compartments located above the measuring receptacle. A dual purpose is clearly secured by using the auxiliary measuring tank as an inlet manifold and an outage measuring device. The measuring receptacle is, necessarily, of a predetermined capacity, such capacity being equally divisible into the capacity of each of the main storage compartments. Stated conversely, each of the main storage compartments has a capacity which is an exact multiple of the measuring receptacle.

Referring now in detail to the drawings, reference numeral 10 generally indicates the cargo tank which is adapted to be mounted on a vehicle truck chassis or other form of suspension in any suitable manner. The tank 10 may be considered to be generally elliptical and is formed of end walls 11 and 12 and side wall 13. Partitions 14 divide the tank 10 into a plurality of sections, for example, as shown, three separate compartments. Each of the compartments is adapted to hold a predetermined quantity of fluid such as gasoline. For instance, compartment A may hold 1200 gallons and compartment B may hold 1500 gallons, while compartment C may hold 1800 gallons. As will be explained hereinafter more fully, the capacity of the compartments may be varied relatively to the capacity of the measuring vessel.

Each compartment is provided with the usual dome caps 15, for providing the customary venting of the compartments as well as to give access to the compartments. The compartments may also be provided with suitable sight gauges or other liquid level gauges to indicate the liquid level of the various compartments during the filling operation. It is preferred, however, to construct the compartments as shown and described in my co-pending application Serial No. 587,471, filed April 10, 1945, now Patent No. 2,539,663, issued Jan. 30, 1951, which would then enable the filling operator to fill each of the compartments to a predetermined measured capacity easily and quickly while avoiding any possibility of spillage or overflow.

The measuring receptacle generally indicated by the letter D has a capacity of 100 gallons and may be considered to be generally elliptical and formed of end walls 18, and 19 and side wall 20. It will, of course, be understood that both the cargo tank and measuring tank may take various shapes and that the side wall or bottom wall of the cargo tank could form the side wall or top wall of the measuring tank.

The measuring receptacle D is preferably secured to the underside of the main storage compartments A, B and C by suitable brackets 21 in a manner to position the measuring receptacle D directly underneath each of the storage compartments. Suitable conduits 22, 23 and 24 provide communication between storage compartments A, B, C respectively and the measuring receptacle D. Valves 26, 27 and 28 are preferably positioned within compartments A, B and C to control the flow of fluid under gravitation from each of the compartments A, B and C into the measuring receptacle and valve actuating rods 29, 30 and 31 are connected to the valves 26, 27 and 28 to extend upwardly through the compartments and terminate in a suitable control handle or fulcrum lever 32 which, if desired, may also be adapted to be actuated through suitable controls from the ground level.

A dispensing outlet or conduit 35 is placed in communication with the measuring receptacle D through the side wall 20 and a suitable valve 36 is positioned within the measuring receptacle to control the gravity flow of fluid from the measuring receptacle D through the dispensing outlet. Valve 36 may, as shown, be provided with a suitable actuating rod 37 and handle 38 therefor. A filling conduit 40 has one end thereof in communication with the measuring receptacle D while its other end may extend upwardly as indicated to a point slightly above the top of side wall 13 of the tank 10. A suitable closure cap 41 is provided for the upper end of the conduit 40. In the event that filling operations from the ground level are preferred, the filling conduit 40 and its fittings may be dispensed with, and dispensing outlet 35, valve 36 and actuating mechanisms 37 and 38 utilized as the inlet for liquid flow.

Assuming now that the cargo truck is returned in empty condition to the storage location and is ready to be loaded with fluid, such as gasoline, the operator will remove the cap 41 and connect a suitable conduit to the upper portion of the filling conduit 40. Each of the valves 26, 27 and 28 are opened by actuating the control rods 29, 30 and 31 by the handles 32 so as to provide fluid communication between the measuring receptacle D and each of the compartments A, B and C and valve 36 of the dispensing outlet 35 is closed by the actuating rod 37 and handle 38. Fluid then flows into the measuring receptacle D, now used as a manifold, and thereafter into each of the compartments thereabove through a series of connecting pipes. When each of the compartments is completely filled to the desired capacity, the supply of fluid to the filling conduit 40 is cut off. The truck is then filled to a measured capacity of 4600 gallons, 1200 gallons being contained in compartment A, 1500 gallons in compartment B, 1800 gallons in compartment C and 100 gallons in measuring vessel A. The cargo truck is then ready to proceed to a distant point, such as a gasoline service station. Assuming now that the gasoline service station desires delivery of 1300 gallons of gasoline, the operator will then open valve 26 to permit fluid to flow by gravity from compartment A into measuring receptacle D, thereafter, valve 36 will be open to permit flow of fluid by gravity from the measuring receptacle D into the dispensing outlet 35 and into the usual underground storage tank. Thus, the 100 gallons stored in the measuring receptacle D and the 1200 gallons stored in compartment A would be dispensed to satisfy the required 1300 gallons desired. Thereafter, valve 36 will be closed as will also valve 26 and the cargo truck will be ready to proceed to another service station. If the next service station desires delivery of 1600 gallons, the operator would then open valve 28 to permit fluid to flow by gravity from compartment C into the measuring receptacle D. Obviously, only 100 gallons will flow into measuring receptacle D. After the measuring receptacle had been filled valve 28 would then be closed and valve 27 would be opened to permit fluid to flow by gravity from compartment B into measuring receptacle D. Thereafter, valve 36 would be opened to permit fluid to flow by gravity from the measuring receptacle D through the dispensing outlet 35. Since the compartment B held 1500 gallons and the measuring receptacle D had been refilled from compartment C exactly 1600 gallons would be dispensed, leaving exactly 1700 gallons remaining in compartment C. The liquid remaining in compartment C can then be dispensed in 100 gallon lots, until it is emptied, by the proper manipulation of valves 28 and 36 or the entire content dispensed.

It will be understood, of course, that each of the compartments A, B and C may be of any desired capacity and not necessarily the capacity herein mentioned. Also, measuring receptacle D may be of any desired capacity, so long as the capacity of the measuring receptacle is less than, and equally divisible into the capacity of each of the compartments. For instance, if it became the custom of gasoline service stations to desire amounts of gasoline not equally divisible by 100 gallons, the measuring receptacle could have a capacity of 10 gallons, 25 gallons, 50 gallons or the like. It will also be understood that from the capacities given, any desired quantity of fluid could be dispensed from the cargo truck, so long as the desired quantity was in multiples of the measuring receptacle and, in the present instance, of 100 gallons.

From the foregoing detailed description it will be seen that the present invention enables an exact measured quantity of fluid to be dispensed from a gasoline cargo truck, or other fluid conveying vehicle wherein expensive meters are eliminated as well as the usual problems associated therewith.

What I claim and desire to protect by Letters Patent is:

A tank construction adapted for a vehicle comprising a casing, partitions extending thereacross forming a plurality of upper compartments, a lower compartment secured to said casing and positioned directly beneath the upper compartments, each of said upper compartments being in communication by independent conduit means with said lower compartment, valve means in each of said independent conduit means for controlling the fluid flow between each of the upper compartments and the lower compartment, the capacity of each upper compartment, measured in gallons, being a multiple of the gallonage capacity of the lower compartment and each upper compartment having a capacity different from that of each of the other upper compartments, the lower compartment having a feed inlet extending to a point above the upper compartments for gravity delivery of fluid to said lower compartment and gravity delivery of fluid to the upper compartments through the several conduits connecting the lower compartment and the upper compartment, the lower compartment having also a valved dispensing outlet for dispensing fluid received from the upper compartments through said conduits; whereby, when the feed inlet and the valves on said connecting conduits are opened, the lower compartment functions as a manifold for gravity filling of an empty tank, and when the valve on said dispensing outlet and the valve or valves on one or more of said conduits are opened, functions also to continuously receive and dispense a quantity of fluid equal to the capacity of any one or more of the tanks, or the capacity of any one or more of the tanks plus the capacity of the lower compartment, dependent upon whether at the start of dispensing the lower compartment is filled or empty.

FRED HAGUE.

REFERENCES CITED

The following references are of record in the file of this patent:

UNITED STATES PATENTS

| Number | Name | Date |
|---|---|---|
| 47,546 | Hurd | May 2, 1865 |
| 240,442 | Miller | Apr. 19, 1881 |
| 1,590,578 | Harris | June 29, 1926 |
| 1,737,929 | Libby | Dec. 3, 1929 |
| 2,144,465 | Selleck | Jan. 17, 1939 |
| 2,254,994 | Butland | Sept. 2, 1941 |